Feb. 15, 1955 RUISABURO FUKUYAMA 2,702,200
SWIVEL-TYPE HOSE COUPLING WITH RING DETENT
Filed April 30, 1951
Fig. I,
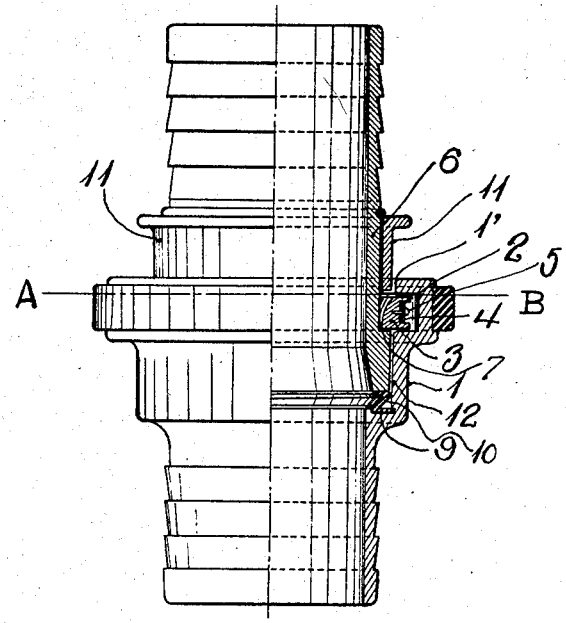
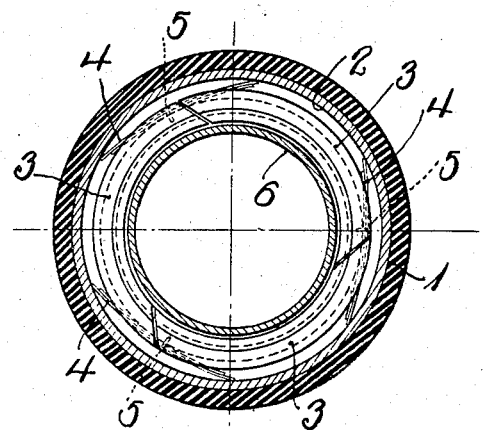
Fig. II,
INVENTOR:
Ruisaburo Fukuyama under# United States Patent Office 2,702,200
Patented Feb. 15, 1955

2,702,200

SWIVEL-TYPE HOSE COUPLING WITH RING DETENT

Ruisaburo Fukuyama, Higashi-Sumiyoshi-Ku, Osaka, Japan

Application April 30, 1951, Serial No. 223,674

Claims priority, application Japan October 1, 1950

1 Claim. (Cl. 285—97.3)

This invention relates to improvements in hose couplings.

An object of the invention is to provide a construction wherein a clutch member is formed in sections for releasably coupling the parts together.

A still further object of the invention is to provide a construction wherein a sectional clutch member is resiliently urged inwardly and is also provided with interior cam surfaces for coaction with an axially slidable member for easily releasing the clutch members and thereby uncoupling the coupling.

With the above and other objects in view which will become apparent from the detailed description below, one preferred form of the invention is shown in the drawings in which:

Fig. I is an elevational view of the hose coupling with one side thereof shown in cross-section, and Fig. II is a transverse cross-sectional view taken upon section line A—B of Fig. I.

In the figures like reference characters indicate like parts.

The female member 1 of the hose coupling is provided with a circular groove 2 at the interior thereof, immediately below the end 1', in which are disposed the clutch elements 3, 3 and 3. The clutch elements 3 are of arc shape as shown particularly in Fig. II and at the inner surface thereof are provided with a sloping surface which is designed to coact with the axially slidable releasing sleeve 11.

Near one end of each of the outward surfaces of the clutch members 3 there is positioned at substantially its central portion a spring plate 4 which is fixed by means of the rivet 5 to a clutch member 3 near one end thereof. The spring plate 4 extends over the adjacent end of a neighboring clutch element and bears against the inner wall of the groove 2. The male member 6 of the coupling is provided with a shoulder 7 with which the clutch elements 3 cooperate.

The inner end of the male member 6 coacts with a rubber valve packing 10 of Z-shaped cross-section which is fixed in the concave portion of the inside step 9 of the female member and is urged and pressed tightly against the end surface 8 of the male member.

At the interior the female member 1 is provided with a circular surface 12 extending below the groove 2 as seen in Figure I which snugly fits the entire outer circumference of the male member extending below the shoulder 7 and extending to the packing 10.

The end surfaces of the clutch elements 3 are cut in an oblique line as shown so that such elements will be retained within the groove 2.

The above construction provides a secure coupling between the elements thereof and in addition the rubber packing 10 eliminates any suction of air through the coupling. Also, due to the snug fit between the surface 12 and the surface below the shoulder 7 on the male member there is sufficient strength provided between the various elements.

The clutch elements 3 as shown are in the form of continuously connected rings and are capable of freely rotating within the circular groove 2. Therefore they are capable of automatically adjusting to any twist of the hose during use. Furthermore, as is obvious, the various elements of the clutch may be easily removed from the groove 2 and replaced if necessary. The manufacture is also relatively easy.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim as my invention:

A hose coupling comprising a female tubular coupling member provided on its internal circular periphery with a circular groove containing a plurality of arc shaped clutching members fitting into said groove to contact each other along each end to form a ring of contacting clutching members, a spring plate rigidly secured at its central portion adjacent one end of the back surface of each of the clutching members and overlying the contacting end of the adjacent clutching member, said spring plate protruding from the contracting surface of the clutching members to contact the internal periphery of the coupling, a male tubular coupling element provided with a flange, said flange being adapted to contact said clutching members about its entire edge, a rubber valve packing which presses tightly against the end surface of the male tubular coupling element and said clutching members in said circular groove fitting tightly against the entire radial side of the flange of the male tubular element and against the surface of the male tubular element.

References Cited in the file of this patent

UNITED STATES PATENTS

| 1,587,079 | Machino | June 1, 1926 |
| 2,111,956 | Baldwin | Mar. 22, 1938 |
| 2,381,962 | Krone | Aug. 14, 1945 |